Figure 1:
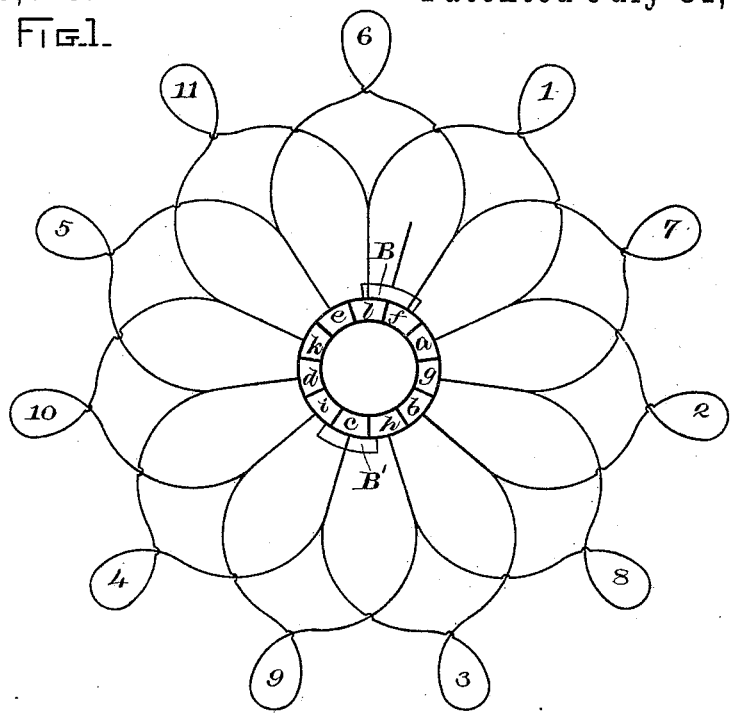

(No Model.) 3 Sheets—Sheet 1.

H. G. REIST.
ARMATURE FOR DYNAMO ELECTRIC MACHINES.

No. 523,685. Patented July 31, 1894.

WITNESSES
Henry Westendarp.
F. G. Johnston.

INVENTOR
Henry G. Reist by
Bentley and Blodgett
Attys.

(No Model.) 3 Sheets—Sheet 2.
H. G. REIST.
ARMATURE FOR DYNAMO ELECTRIC MACHINES.
No. 523,685. Patented July 31, 1894.
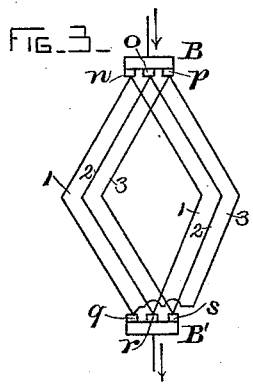
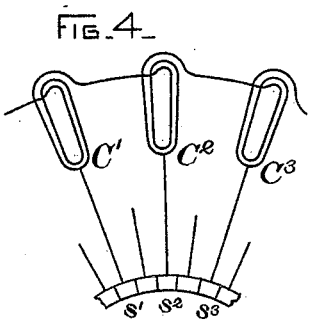
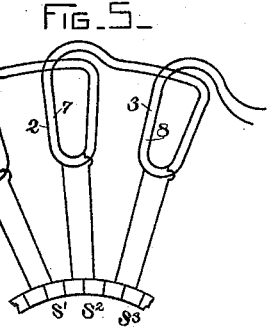
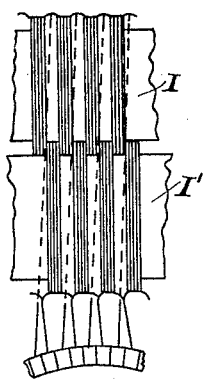
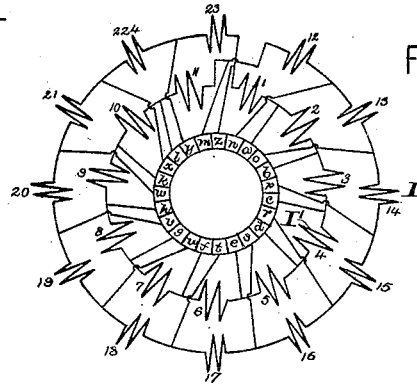
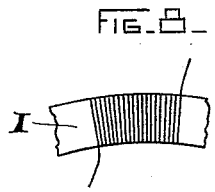
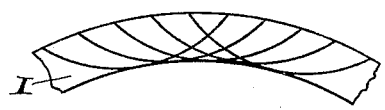
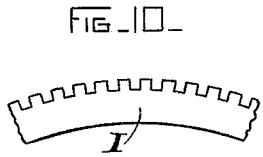
WITNESSES
Alec F. Macdonald.
F. A. Dailey
INVENTOR
Henry G. Reist, by
Bentley and Blodgett
Attys.

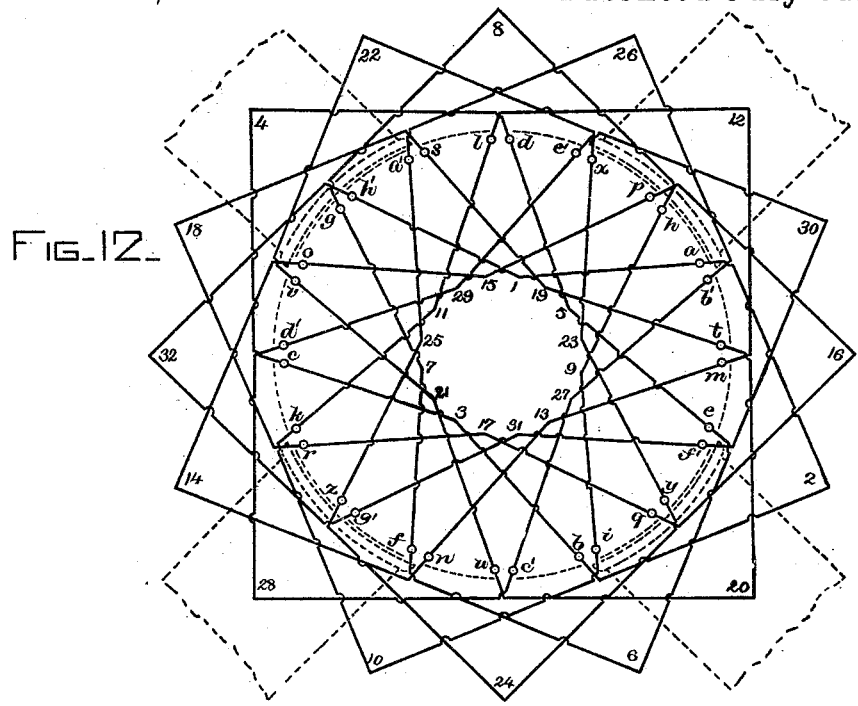

UNITED STATES PATENT OFFICE.

HENRY G. REIST, OF LYNN, ASSIGNOR TO THE GENERAL ELECTRIC COMPANY, OF BOSTON, MASSACHUSETTS.

ARMATURE FOR DYNAMO-ELECTRIC MACHINES.

SPECIFICATION forming part of Letters Patent No. 523,685, dated July 31, 1894.

Application filed September 15, 1893. Serial No. 485,596. (No model.)

*To all whom it may concern:*

Be it known that I, HENRY G. REIST, a citizen of the United States, and a resident of Lynn, in the county of Essex and State of Massachusetts, have made certain new and useful Improvements in Armatures for Dynamo-Electric Machines, of which the following is a specification.

My invention relates to armatures for dynamo electric machines or motors and particularly to the winding of such armatures designed to generate or respond to currents of large quantity and moderate or low potential; and has for its object to enable me to construct such a machine readily and economically. To this end I provide a winding which consists of closed coils arranged in a peculiar way, the main feature of novelty being in connecting the coils in ranges running two, three or more times around the armature, with a connection taken from each coil to a commutator segment, all as more fully pointed out hereinafter, the special novelty being designated in the claims.

In the drawings Figures 1, 2, 3, 4 and 5, are diagrams of windings in accordance with my invention. Figs. 6 and 7 are modifications. Figs. 8, 9, 10 and 11, show armature cores upon which the invention may readily be applied, and Figs. 12 and 13 are further modifications adapted to multipolar fields.

In Fig. 1 the coils 1 to 11 represent a series of coils wound on the surface of a drum or ring armature, with or without projections. In ordinary cases these coils would be in series in closed circuit, and the connections between the coils or turns on the armature would be made to the commutator segments successively. This would give a potential at the diameter of commutation when run in a bipolar field which is equal to that due to half the total length of the wire in the two sides of the armature, working in multiple. In my invention the winding is such that this potential is halved. Thus, coil 1 in being connected to its next coil in the order of succession around the commutator is not connected to adjacent coil 7 but to the next coil but one, 2, and at the same time a lead to the commutator segment $a$ is brought down. Coil 2 instead of being connected to the next succeeding coil, which would be coil 8, is carried to the next but one, *i. e.*, coil 3, and a lead to the commutator segment $b$ is taken. In like manner coil 3 is connected to the next but one, marked 4, and a lead taken to the segment $c$. Coil 4 to coil 5, in like manner with a lead to segment $d$. Coil 5 instead of being connected to coil 11, is carried forward to coil 6 while a lead is taken to segment $e$. Coil 6 to coil 7, and a lead is taken to segment $f$ and coil 7 to coil 8, a lead taken to segment $g$, and coil 8 to 9, with a lead to segment $h$, coil 9 to coil 10, a lead to segment $i$, and coil 10 to coil 11, with a lead to segment $k$; thence to coil 1 completes the circuit to the starting of the winding, with a lead to segment $l$: each range or series of coils being connected to its own set of commutator-segments, and the sets of commutator segments being symmetrically disposed with reference to each other. If this structure be run in a magnetic field, points of opposite potential around the commutator will be found in accordance with the number of poles in the field, and brushes, shown in Figs. 1, 2 and 3 of the drawings, applied at these points would receive current. Such brushes would as shown, always cover two or more segments in taking off the current, that is, the overlap of the brushes would always cover at least two segments, or even more in cases where the segments are very numerous. It will be understood also that the coils on any given armature may be very numerous, and ordinarily this would be the case; but the system of winding will not differ substantially from that described, which represents a closed wire doubled on itself with the single loops representing coils.

There might be one hundred coils on the armature with one hundred segments in the commutator and one hundred leads and the succession would be the same as in Fig. 1. This would make the angular space covered on the commutator by the brushes much smaller than shown in the diagram, which is made as simple as possible to show the construction.

The coils, 1 &c., may indicate either coils proper or armature bars, corresponding to the armature sections or the sections of conductor between the segments of the commutator.

Figure 2:
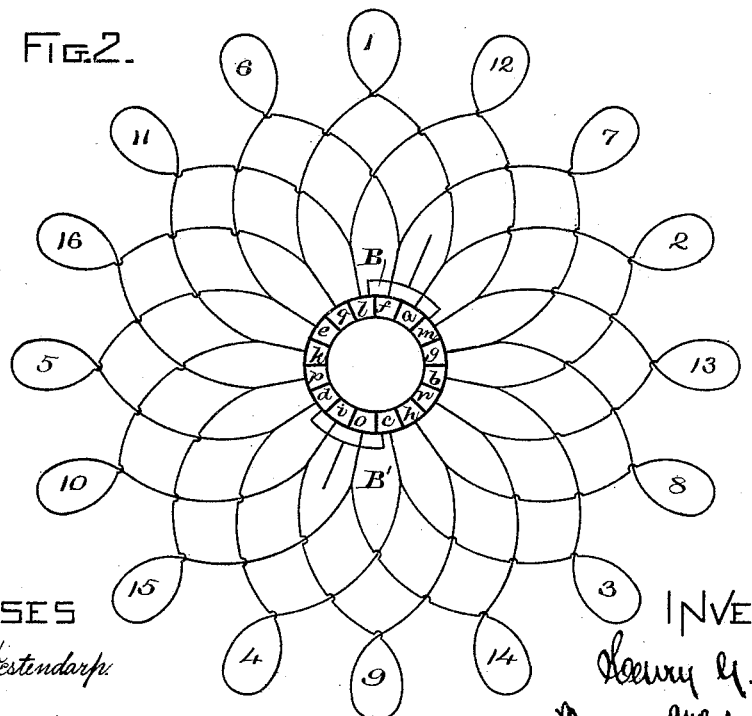

In Fig. 2 the arrangement is shown modified in that the coils in closed circuit pass three times around, or the connection of one coil to its succeeding coil is not to the next but one, but to the next but two; thus, coil 1 is connected to the next but two, marked 2, with a lead to commutator segment $a$, and in like manner connection of coil 2 to coil 3, 3 to 4, 4 to 5, 5 to 6, &c., are made on the same principle as in Fig. 1, with leads to segments which finally fill up the whole number on the commutator and include all the coils, which here are sixteen in number. There may be many more, this number being selected to exemplify the construction with the simplest possible diagram. Brushes as shown are applied to the commutator to touch three segments or more under each brush, and the structure may be run in a bipolar or multipolar field.

Fig. 3 shows in substance the winding of Fig. 2, the coils being united, in order to make the representation more clear; it also shows the paths which are open to the current when brushes, as B, B′, have been applied to touch three segments at opposite diameters. It will be seen that current entering at B divides into three branches to the three segments and then subdivides again at each segment into two branches, making six divisions in all. The current entering the segment $n$ under B passes out by two branches 1, 1, and is delivered, not to the corresponding segment in contact with the brush B′, but to the two segments $q\ r$. The current which enters the segment $o$ under B passes out by the two branches 2, 2, and is delivered by the segments $r$, $s$, in contact with brush B′. The current entering from brush B into the segment $p$ passes through the conductors 3, 3, on the armature and is delivered at brush B′ to the segments $q$, $s$: so that it will be seen that current entering at any single segment on the one side of the commutator always passes out at two segments at the opposite potential point, thus distributing the action of commutation, the wear of the segments, and the delivery of the current in a way which is peculiar to my invention and is one of its valuable features. It is manifest that this subdivision or multiplication of the path of the currents may be further extended as far as may be found desirable, thus avoiding the short circuiting of adjacent segments under heavy current to any required extent.

Fig. 4 shows how each coil $C'$, $C^2$, $C^3$, may be composed of several turns, and the leads to segments $s'$, $s^2$, $s^3$, be taken from the coils themselves and not from connections of the coils one to the other. Only the coils of one range are shown, but the intervening segments of the commutator are indicated with their leads not connected. These leads are connected to coils intermediate between the coils shown, in case of passing twice around in making the closed circuit, as in Fig. 1.

Fig. 5 shows that instead of coils 1 to 6; 2 to 7; 3 to 8; 4 to 9; and 5 to 10, being successive coils on the armature they may be overwound or parallel, forming a doubled winding. In this case the connections would not differ from Fig. 1, one set of coils of the winding being connected around and continued on the other or second set until all coils were included in one wire or connection, forming a closed-circuit winding wrapped, as it were, on itself. The commutator arrangements may be of the same character as in Fig. 1, or may be connected to leads from the coils proper, as shown. The segments belonging to the first range around the armature would be, as before, intermediate with the segments belonging to the second range of the closed circuit winding; but these segments like the coils might, if desired, be placed alongside in the same line so as to be practically coincident in position or in the same line parallel to the axis instead of being peripherally successive. This, however, is a more difficult construction than the manner shown.

Fig. 6 shows that the coils of the different ranges connected in closed circuit may be wound on separate iron cores or armature rings, I, I′; the sections I of the closed ring having upon it, for example, the first range or connection which is continued around again through the second range, carried by I′. The coils subjected to the same magnetic influence may thus be situated not upon the same core in succession, and not upon the same core parallel and adjacent, but on different cores, provided the connections into a complete doubled ring are preserved. This is indicated more clearly in Fig. 7, where the outer range of coils would represent those upon core I while the inner range would represent those upon I′: the order of connections of a twenty-three part commutator being thereby illustrated. Part of the coils in one range around might be upon core I and part upon I′, so long as the succession and connection of the ranges into one closed circuit are preserved. While in Figs. 2 and 3 the coils forming only two or three closed circuits have been shown, it will be evident that my invention contemplates two, three, or more ranges similarly connected into one closed circuit. My invention also contemplates, if desired, the use of a stranded winding or conductor, as frequently employed in the winding of armatures, instead of the single lines shown; each strand in such case being a separate conductor.

Fig. 8 indicates that the coils may be wound upon a ring, a portion of which is shown at I, in the ordinary Gramme winding, or, as seen in Fig. 9, the coils may be laid upon the exterior of an iron drum or ring, the end connections being seen as crossing conductors, such an arrangement being adapted for use in a multipolar field. Figs. 10 and 11 show that instead of smooth iron cores being used to receive the coils projections on the cores may be employed as commonly practiced in the construction of dynamos and motors. This manner of winding may be applied to the case of a multipolar dynamo or motor in which the connection of the armature coils is what is known as a "series connection," that is, in which a coil or conductor under one pole is connected to a reversed coil or conductor under the next pole, and, again, to another coil or conductor under a similar pole to the first, and, again, to another coil or conductor like the second, and so on, until, after passing around through the series, connection is made to the commutator segment and to a coil or section on the armature adjacent to the first coil or section, which is connected to a coil or section adjacent to the second section mentioned, and so on; or in which the winding, instead of being a succession of turns around the periphery of the armature connected at intervals to the commutator segments, is a set of windings under each pole connected, relatively, to form a coil or section of an armature and assist each other; which series section, a part under each pole, is in turn connected to successive series sections displaced over the first continuously. It would be difficult to display such a winding in relative position on an armature, especially extended to show my invention, as the lines would be so complicated as to be very difficult to understand or follow. I therefore, prefer to illustrate it diagrammatically as in Figs. 12 and 13, which may be described as follows:

In Fig. 12, the winding is illustrated as applied to a four-pole machine, and in Fig. 13 to a six-pole dynamo; in both figures, the small reference letters show the coil-spaces upon the periphery of the armature, which may be a drum or ring, and may or may not be toothed or slotted, as may be desired; while the odd figures in the inner small circle, as 1—3—5, &c., represent the commutator segments and the even figures of the larger or outer circle represent the coils of the different ranges, two in number in both cases. Starting with the commutator segment 1 in Fig. 12, I follow the lead to the coil-space $a$, thence to coil 2, to space $b$, from whence a lead is taken to the segment 3 of the commutator, and thence to space $c$, to coil 4, and so on around the armature, a further description being rendered unnecessary, the order being plainly indicated by the figures and letters. By following out the order illustrated I arrive at the point 15 adjacent to 1, having completed one range around the armature and left alternate spaces $p$, $q$, $r$, &c., unoccupied. By further tracing the connections as illustrated in the figure the second range of coils 16 to 32 around the armature may be found, and they will fill the spaces between the coils of the first range and their leads will be taken off so as to connect with the alternate commutator segments not connected to the coils of the first range. Similarly in Fig. 13, starting at segment 1, I proceed to coil-space $a$, to coil 2, to space $b$, to coil 3 and so on until, arriving at 23, I have gone completely around the armature, leaving alternate commutator segments unconnected to any coil; from thence it is easy to trace the coils until the final lead $z'$ back to commutator segment 1 shows the re-entrance and closure of the winding upon itself.

By my invention I am able to construct machines of comparatively low potential and of considerable size, which is difficult to do with the ordinary construction. I am also enabled to construct machines of very large size at ordinary potentials, such as two hundred to five hundred volts, such machines being very difficult to construct by ordinary windings because the potential is not high enough to give the requisite number of divisions in the commutator, and the commutation would be made by passing from segment to segment too large currents for safety, giving rise to excessive sparking.

My invention subdivides the work of the segments, distributes the currents from the segments at the positive and negative sides and so obviates the difficulties which would otherwise be experienced.

It will be seen from the foregoing description that my invention comprises a winding different from the ordinary ones in having the conductor carried around the armature more than once before being connected at its beginning into a closed coil. This I believe to be broadly novel and of great utility; I therefore wish to be understood as claiming hereby any construction involving this feature. My invention also contemplates providing multiple paths for the current from the negative brush through the coils to a plurality of commutator segments under the positive brush, which also I believe to be entirely new, and which I wish to claim broadly.

Having thus described my invention, what I claim, and wish to protect by Letters Patent of the United States, is—

1. In an armature, a closed winding formed into coils extending in a plurality of series more than once around the armature and connected to alternate sections of a commutator, so as to connect each section of the commutator to a plurality of other sections thereof; thus forming a plurality of ranges of coils, each range of coils acting in series, and the several ranges acting in multiple, as herein described and set out.

2. An armature winding consisting of ranges of coils all connected in a closed-circuit and connected at intervals to commutator segments, the ranges of coils being arranged on the armature to extend more than once around it, the commutator segments connected to the coils forming one range being intermediate between the commutator segments connected to the coils forming the other range each commutator segment being connected by different sets of coils to a plurality of other segments.

3. In combination a commutator, positive and negative brushes thereon, each brush covering more than one segment, and connections affording multiple paths for the current between the positive and negative brushes, each of said paths containing a set of series-connected coils.

4. In combination an armature core, a commutator, positive and negative brushes each covering more than one segment of the commutator, and coils on the armature core connected to the commutator segments so as to afford at all times multiple paths between the positive and negative brushes, each of said paths containing a separate set of series-connected coils.

5. In combination an armature core, a commutator, positive and negative brushes, each covering more than one segment of the commutator, and ranges of coils extending more than once around the armature; the coils in one range being connected to segments of the commutator intermediate between the segments connected to the coils forming the other range.

6. In combination, an armature core, a commutator, positive and negative brushes, each covering a plurality of segments of the commutator, and a winding on the armature core connected to the commutator segments; the said winding consisting of a plurality of ranges of coils extending around the armature, the separate ranges of coils being connected in series, and the coils of one range being connected to commutator segments intermediate between the commutator segments connected to the coils of the other range.

7. In an armature, a winding formed into a plurality of ranges of coils in series with each other, the coils in one range being connected to one set of commutator segments and the coils in the other ranges being connected to other sets of commutator segments symmetrically disposed between the segments of the first set and arranged to form multiple paths from each commutator segment to a plurality of other segments.

8. In combination, a commutator, positive and negative brushes thereon, each brush covering more than one segment, and connections, substantially as described, adapted to divide the current entering a segment from the negative brush into multiple paths leading to different segments under the positive brush whereby the current passing from one segment to another when short-circuited by the brush is reduced, and sparking diminished.

9. An armature having a closed circuit winding successive portions of which are connected at intervals more than once around the commutator, the connections of the second or a succeeding range being made at points intermediate between the connections of the first or a preceding range, thus forming multiple paths from each commutator segment to a plurality of the other segments.

In witness whereof I have hereunto set my hand this 13th day of September, 1893.

HENRY G. REIST.

Witnesses:
JOHN W. GIBBONEY,
BENJAMIN B. HULL.